(12) United States Patent
Pick et al.

(10) Patent No.: US 8,526,889 B2
(45) Date of Patent: Sep. 3, 2013

(54) SHARED SOFT METRIC BUFFER FOR CARRIER AGGREGATION RECEIVERS

(75) Inventors: Kobby Pick, Modiin (IL); Yona Perets, Ra'anana (IL); Daniel Yellin, Ra'anana (IL)

(73) Assignee: Marvell World Trade Ltd., St. Michael (BB)

( * ) Notice: Subject to any disclaimer, the term of this patent is extended or adjusted under 35 U.S.C. 154(b) by 276 days.

(21) Appl. No.: 13/168,978

(22) Filed: Jun. 26, 2011

(65) Prior Publication Data
US 2012/0028592 A1 Feb. 2, 2012

Related U.S. Application Data

(60) Provisional application No. 61/368,172, filed on Jul. 27, 2010.

(51) Int. Cl.
*H04B 1/06* (2006.01)

(52) U.S. Cl.
USPC .......................................... 455/67.11; 455/69

(58) Field of Classification Search
USPC ............... 455/226.1, 226.2, 226.3, 67.11, 69, 455/70
See application file for complete search history.

(56) References Cited

U.S. PATENT DOCUMENTS

| | | |
|---|---|---|
| 6,512,750 B1 | 1/2003 | Palenius |
| 6,757,319 B1 | 6/2004 | Parsa et al. |
| 6,768,727 B1 | 7/2004 | Sourour et al. |
| 7,184,791 B2 | 2/2007 | Nilsson et al. |
| 8,150,478 B2 * | 4/2012 | Perets et al. ................... 455/574 |
| 2001/0019577 A1 | 9/2001 | Ha |
| 2006/0045062 A1 | 3/2006 | Gorokhov et al. |
| 2006/0274712 A1 | 12/2006 | Malladi et al. |
| 2007/0110100 A1 | 5/2007 | Wunder et al. |
| 2007/0141994 A1 * | 6/2007 | Cheng ............................. 455/69 |
| 2007/0149229 A1 | 6/2007 | Frederiksen et al. |
| 2007/0183591 A1 | 8/2007 | Geile et al. |
| 2007/0253466 A1 | 11/2007 | Jones et al. |
| 2007/0259671 A1 | 11/2007 | Cheng et al. |
| 2008/0081655 A1 | 4/2008 | Shin et al. |
| 2008/0108365 A1 | 5/2008 | Buddhikot et al. |
| 2008/0207135 A1 | 8/2008 | Varadarajan et al. |

(Continued)

FOREIGN PATENT DOCUMENTS

| | | |
|---|---|---|
| EP | 0955736 A2 | 11/1999 |
| EP | 1898540 A1 | 3/2008 |

(Continued)

OTHER PUBLICATIONS

JP Patent Application No. 2011-518043 Office Action dated Oct. 23, 2012.

(Continued)

*Primary Examiner* — Blane J Jackson

(57) ABSTRACT

A method in a receiver includes receiving from a transmitter an aggregated-spectrum signal including at least first and second component carriers in respective spectral bands. Information related to processing one or more of the component carriers is buffered in at least one shared buffer, such that storage locations in the shared buffer are selectably assignable for storing at least first information related to the processing of the first component carrier and second information related to the processing of the second component carrier. The one or more of the component carriers are processed in the receiver using the information buffered in the shared buffer.

20 Claims, 2 Drawing Sheets

(56) References Cited

U.S. PATENT DOCUMENTS

| | | | |
|---|---|---|---|
| 2008/0229177 | A1 | 9/2008 | Kotecha |
| 2009/0163157 | A1 | 6/2009 | Zolfghari |
| 2009/0224973 | A1 | 9/2009 | Nayyar |
| 2009/0257533 | A1 | 10/2009 | Lindoff et al. |
| 2009/0258628 | A1 | 10/2009 | Lindoff et al. |
| 2009/0264120 | A1 | 10/2009 | Karabinis |
| 2009/0279480 | A1 | 11/2009 | Rosenqvist et al. |
| 2009/0300456 | A1 | 12/2009 | Pelletier et al. |
| 2009/0316659 | A1 | 12/2009 | Lindoff et al. |
| 2010/0015967 | A1 | 1/2010 | Perets et al. |
| 2010/0020852 | A1* | 1/2010 | Erell et al. ............ 375/141 |
| 2010/0172279 | A1 | 7/2010 | Chen et al. |

FOREIGN PATENT DOCUMENTS

| | | |
|---|---|---|
| EP | 2012552 A1 | 1/2009 |
| WO | 97/02665 A2 | 1/1997 |
| WO | 00/01084 A1 | 1/2000 |

OTHER PUBLICATIONS

U.S. Appl. No. 12/499,807 Office Action dated Oct. 11, 2012.
U.S. Appl. No. 12/499,807 Official Action dated Nov. 10, 2011.
U.S. Appl. No. 12/499,807 Office Action dated Jan. 31, 2013.
Japanese Patent Application # 2011519272 Office Action dated Mar. 26, 2013.
European Patent Application # 09797612.0 Extended Search Report dated Feb. 3, 2012.
Jarot et al., "Each Carrier Transmission Power Control for the Reverse Link of OFDM-DS-CDMA System", IEICE Transactions on Communications, vol. E82-B, No. 11, pp. 1851-1857, Nov. 1, 1999.
U.S. Appl. No. 13/400,078 Official Action dated May 1, 2012.
U.S. Appl. No. 12/499,807 Official Action dated Mar. 14, 2012.
Research in Motion, UK Limited, "Uplink Power Control for Carrier Aggregation", 3GPP TSG RAN WG1 Meeting # 57b, Lon Angeles, USA, Jun. 29-Jul. 3, 2009.
Nokia Siemens Networks, "PUSCH Power Control for LTE-Advanced", 3GPP TSG RAN WG1 Meeting # 57bis, Los Angeles, USA, Jun. 29-Jul. 3, 2009.
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008.
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008.
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009.
Qualcomm Europe, Notion of Anchor Carrier in LTE-A, 3GPP TSG RAN WG1 Meeting #55-bis, Ljubljana, Slovenia, Jan. 12-16, 2009.
Samsung, "UL Transmission Power Control in LTE-A", 3GPP TSG RAN WG1 Meeting #56bis, Seoul, Korea, Mar. 23-27, 2009.
NTT Docomo et al., "Prioritized Deployment Scenarios for LTE-Advanced Studies", 3GPP TSG RAN WG4 Meeting # 50, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009.
3rd Generation Partnership Project; Technical Specification Group Radio Access Network; Further Advancements for E-UTRA Physical Layer Aspects (Release 9), 3GPP TR 36.814 V0.4.1, Sophia Antipolis, France, Feb. 2009.
3rd Generation Partnership Project; Technical Specification Group Radio Access Network; Evolved Universal Terrestrial Radio Access (E-UTRA); Physical Later Procedures (Release 8), Draft 3GPP TS 36.213, V8.6.0, Sophia Antipolis, France, 2009.
Huawei, "The Impact of CA on Mobility in LTE-A", 3GPP TSG RAN WG1 Meeting #56, Athens, Greece, Feb. 9-13, 2009.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
3rd Generation Partnership Project; Technical Specification Group Radio Access Network; Evolved Universal Terrestrial Radio Access (E-UTRA); Physical layer procedures (Release 8), 3GPP TS 36.213, V8.4.0, Sophia Antipolis, France, Sep. 2008.
Nortel, "On the discussions of carrier aggregations", 3GPP TSG-RAN Working Group 1 Meeting #55, Prague, Czech Republic, Nov. 10-14, 2008.
NTT Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101, V8.5.1, Sophia Antipolis, France, Jan. 2009.
Ericsson, "Carrier Aggregation in LTE-Advanced", TSG-RAN WG1 #53bis, Warsaw, Poland, Jun. 30-Jul. 4, 2008.
Alcatel-Lucent, "Fractional power Control using Pilot Power Ratio Measurements for the E-UTRA Uplink", 3GPP TSG-RAN WG1 #48, St. Louis, USA, Feb. 12-16, 2007.
Motorola, "Uplink Power Control for E-UTRA", 3GPP TSG RAN1 #48, St. Louis, USA, Feb. 12-16, 2007.
Motorola, "Interference Mitigation via Power Control and FDM Resource Allocation and UE Alignment for E-UTRA Uplink and TP", 3GPP TSG RAN1 #44, Denver, USA, Feb. 13-17, 2006.
Rapporteur (NTT DOCoMo), "Text proposal for RAN1 TR on LTE-Advanced", 3GPP TSG RAN WG1 Meeting #53bis, Warsaw, Poland, Jun. 30-Jul. 4, 2008.
International Application PCT/IB09/52987 Search Report dated Jan. 27, 2010.
U.S. Appl. No. 12/397,366, filed Mar. 4, 2009.
International Application PCT/IB2009/053164 Search Report dated Aug. 4, 2011.
U.S. Appl. No. 12/348,375 Official Action dated Jun. 21, 2011.
U.S. Appl. No. 12/348,375 Official Action dated Sep. 15, 2011.
JP Patent Application # 2011519272 Office Action dated Sep. 11, 2012.
EP Patent Application # 09797612.0 Office Action dated Aug. 22, 2012.
NTT Docomo, Inc., "Proposals for LTE-Advanced Technologies", 3GPP TSG RAN WG1 Meeting # 53, Kansas City, USA, May 5-9, 2008.
International Application PCT/IB2011/052803 Search Report dated Dec. 2, 2011.

* cited by examiner

SHARED SOFT METRIC BUFFER FOR CARRIER AGGREGATION RECEIVERS

CROSS-REFERENCE TO RELATED APPLICATIONS

This application claims the benefit of U.S. Provisional Patent Application 61/368,172, filed Jul. 27, 2010, whose disclosure is incorporated herein by reference in its entirety.

FIELD OF THE DISCLOSURE

The present disclosure relates generally to communication systems, and particularly to methods and systems for data buffering in aggregated-spectrum receivers.

BACKGROUND

Some communication systems employ spectrum aggregation techniques, in which a wireless terminal communicates with a base station over multiple aggregated carriers to provide high bandwidth capabilities. The use of spectrum aggregation is contemplated, for example, in Long Term Evolution Advanced (LTE-A) systems that are being specified by the 3rd Generation Partnership Project (3GPP). LTE-A is addressed, for example, in 3GPP Technical Report 36.913, entitled "Technical Specification Group Radio Access Network; Requirements for Further Advancements for Evolved Universal Terrestrial Radio Access (E-UTRA)," (TR 36.913), version 8.0.1, March, 2009, which is incorporated herein by reference in its entirety.

Spectrum aggregation is also described in 3GPP Technical Specification Group Radio Access Network Working Group 1 (TSG-RAN WG1) report R1-082468, entitled "Carrier Aggregation in LTE-Advanced," Warsaw, Poland, Jun. 30-Jul. 4, 2008, which is incorporated herein by reference in its entirety.

The description above is presented as a general overview of related art in this field and should not be construed as an admission that any of the information it contains constitutes prior art against the present patent application.

SUMMARY

An embodiment that is described herein provides a method in a receiver. The method includes receiving from a transmitter an aggregated-spectrum signal including at least first and second component carriers in respective spectral bands. Information related to processing one or more of the component carriers is buffered in at least one shared buffer, such that storage locations in the shared buffer are selectably assignable for storing at least first information related to the processing of the first component carrier and second information related to the processing of the second component carrier. The one or more of the component carriers are processed in the receiver using the information buffered in the shared buffer.

In some embodiments, buffering the information includes setting a capacity of the shared buffer to be smaller than a sum of respective maximal data sizes of the at least first and second information. In an embodiment, receiving the aggregated-spectrum signal includes receiving three or more component carriers, and buffering the information includes selectably assigning the storage locations in the shared buffer to the information related to the processing of any of the three or more component carriers.

In some embodiments, the method includes computing respective at least first and second soft metrics for the at least first and second component carriers, and buffering the information includes jointly buffering the at least first and second soft metrics in the shared buffer. In an embodiment, receiving the aggregated-spectrum signal includes receiving an initial transmission on the first component carrier and subsequently receiving on the first component carrier a retransmission related to the initial transmission, computing the soft metrics includes calculating the soft metrics both for the initial transmission and for the retransmission, jointly buffering the soft metrics includes buffering the soft metrics calculated for the initial transmission, and processing the component carriers includes demodulating the first component carrier by combining the soft metrics calculated for the initial transmission with the soft metrics computed for the retransmission. In a disclosed embodiment, jointly buffering the soft metrics includes unpacking the soft metrics calculated for the initial transmission, combining the unpacked soft metrics with the soft metrics computed for the retransmission, and repacking the combined soft metrics in the shared buffer.

In some embodiments, buffering the information includes partitioning the shared buffer into at least first and second portions for buffering the at least first and second information, respectively. In an embodiment, partitioning the shared buffer includes deciding on the at least first and second portions by the receiver. In another embodiment, the method includes signaling the decided partitioning from the receiver to the transmitter.

In yet another embodiment, the method includes receiving from the transmitter one or more signaling messages that specify at least first and second portions into which the shared buffer is to be partitioned, and configuring the shared buffer responsively to the signaling messages. In an embodiment, the method includes sending feedback from the receiver to the transmitter, so as to enable the transmitter to specify the portions based on the feedback.

In a disclosed embodiment, buffering the information includes allocating storage space for buffering the information in the shared buffer based on a time of arrival of the information. In another embodiment, buffering the information includes overriding at least part of the buffered information with subsequent information based on a predefined criterion.

There is additionally provided, in accordance with an embodiment that is described herein, apparatus including a receiver, a memory and processing circuitry. The receiver is configured to receive from a transmitter an aggregated-spectrum signal including at least first and second component carriers in respective spectral bands. The memory holds at least one shared buffer. The processing circuitry is configured to buffer in the shared buffer information related to processing one or more of the component carriers, such that storage locations in the shared buffer are selectably assignable for storing at least first information related to the processing of the first component carrier and second information related to the processing of the second component carrier, and to process the one or more of the component carriers in the receiver using the information buffered in the shared buffer. In some embodiments, a mobile communication terminal includes the disclosed apparatus. In some embodiments, a base station includes the disclosed apparatus. In some embodiments, a chipset for processing signals in a mobile communication terminal includes the disclosed apparatus.

There is also provided, in accordance with an embodiment of the present invention, apparatus including a receiver, a memory and a processing unit. The receiver is configured to receive from a transmitter an aggregated-spectrum signal including a plurality of component carriers in respective spectral bands. The memory includes at least one shared buffer. The processing unit is configured to process signals transmitted on the plurality of component carriers by the transmitter, and to selectively allocate memory space in the shared buffer to ones of the respective component carriers, for use in processing data in the signals carried on the component carriers, in response to control signals transmitted by the transmitter.

The present disclosure will be more fully understood from the following detailed description of the embodiments thereof, taken together with the drawings in which:

DETAILED DESCRIPTION OF EMBODIMENTS

An aggregated-spectrum signal comprises multiple broadband component carriers that are transmitted simultaneously. Reception and processing of the multiple component carriers involves handling a large volume of information and potentially consumes large memory space in the receiver. For example, when an aggregated-spectrum system uses a Hybrid Automatic Repeat reQuest (HARQ) scheme, the receiver typically buffers soft metrics for the received data, as well as for data retransmissions. The buffer size required for buffering every soft metric that may be received over every component carrier is large, and becomes a considerable factor in the cost and size of receiver devices.

Embodiments that are described hereinbelow provide improved methods and systems for buffering information in aggregated-spectrum receivers. In some embodiments, the receiver comprises a shared buffer that is used for buffering soft metrics (or other information) related to processing of the various component carriers. The buffer is shared in the sense that its memory locations are selectably assignable for storing information related to any of the component carriers.

The size of the shared buffer is typically set far below the maximum theoretical memory size that would be required for storing every soft metric (or other information) for every component carrier. As a result, considerable memory savings are achieved. With this choice of buffer size there is some probability that the volume of information provided for buffering might exceed the shared buffer size, but this probability is typically small and the resulting loss of information is usually tolerable.

Several example buffer sharing schemes are described herein. Some sharing schemes are static, while others are variable. In some embodiments the partitioning of the shared buffer among the component carriers is set by the receiver, with or without notification to the transmitter. In other embodiments the partitioning is set by the transmitter and signaled to the receiver, either based on or regardless of feedback from the receiver. The disclosed techniques significantly reduce the memory size in the receiver in comparison with conventional receiver and memory architectures, and therefore reduce the receiver's cost, size and power consumption.

Figure 1:
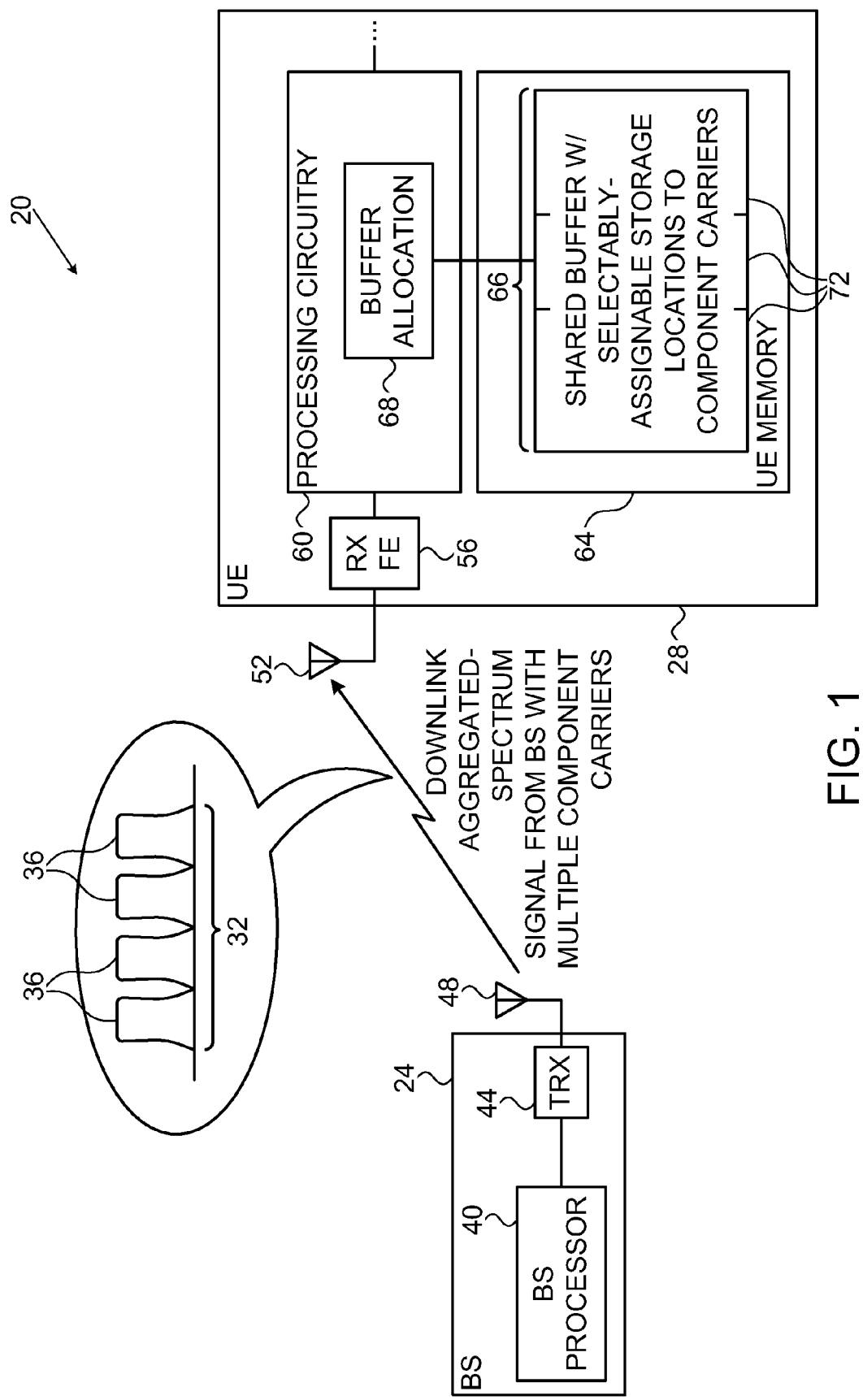
FIG. 1 is a block diagram that schematically illustrates an aggregated-spectrum communication system, in accordance with an embodiment that is described herein.

FIG. 1 is a block diagram that schematically illustrates an aggregated-spectrum communication system 20, in accordance with an embodiment that is described herein. In the present example, system 20 operates in accordance with the LTE or LTE-A specification. In alternative embodiments, system 20 may operate in accordance with any other suitable standard or protocol that supports carrier aggregation, such as, for example, Universal Mobile Telecommunications System (UMTS) protocols such as Wideband Code Division Multiple Access (WCDMA), CDMA-2000 or WiFi.

System 20 comprises a Base Station (BS) 24, which transmits downlink signals to a mobile communication terminal (also referred to as User Equipment—UE) 28. UE 28 may comprise, for example, a cellular phone, a wireless-enabled mobile computing device, or any other suitable type of communication terminal. Although FIG. 1 shows only a single BS 24 and a single UE 28, real-life systems typically comprise multiple BSs and multiple UEs.

In an embodiment, system 20 transmits an aggregated-spectrum downlink signal 32 to UE 28. The aggregated-spectrum signal comprises two or more component carriers 36 that are transmitted in respective spectral bands. In the present example, each component carrier is an LTE carrier, although various other air interfaces can be used in alternative embodiments. In the present example signal 32 comprises four component carriers 36 in adjacent spectral bands. In alternative embodiments, signal 32 may comprise any desired number of component carriers, which may occupy contiguous or non-contiguous spectral bands.

BS 24 comprises a BS processor 40, which generates the aggregated-spectrum downlink signal, and a transceiver (TRX) 44, which transmits the signal over a Radio Frequency (RF) channel to UE 28 using a BS antenna 48. In UE 28, a receiver front-end (RX FE) 56 receives the downlink signal via a UE antenna 52. The RX FE down-converts the received signal to baseband. Processing circuitry 60 processes the baseband signal so as to extract the data that is transmitted over the multiple component carriers.

In some embodiments, processing circuitry 60 computes soft metrics (e.g., Log Likelihood Ratios—LLRs) for the data bits that are received over the various component carriers, and reconstructs the data using the soft metrics. In some embodiments, system 20 uses a HARQ retransmission scheme in which BS 24 retransmits blocks of data that were received with errors in UE 28. The retransmission of a given block sometimes uses a different Modulation and Coding Scheme (MCS) than the initial transmission of the block.

When using HARQ, processing circuitry 60 holds the soft metrics of the initial transmission and, upon receiving the retransmission, computes soft metrics for the retransmitted data bits, and combines the soft metrics of corresponding bits in the initial transmission and in the retransmission. The processing circuitry then reconstructs the data based on the combined soft metrics. Typically, in an embodiment, system 20 carries out HARQ separately and independently over each component carrier.

In some embodiments, UE 28 comprises a memory 64, for example a Random Access Memory (RAM), which holds a shared buffer 66. Shared buffer 66 is used by processing circuitry 60 for storing the soft metrics that are computed for the data received over the component carriers. Generally, no other buffer is available in UE 28 for buffering this information. As will be explained below, however, the probability of overflow in buffer 66 is low, even though the total size of the buffer is relatively small. Several disclosed embodiments provide policies for choosing which of the soft metrics to retain and which to discard in the unlikely event of buffer overflow.

Typically, buffer 66 is partitioned into two or more partitions 72 (also referred to as portions), each partition assigned to hold soft metrics of a respective component carrier. In the present example, each component carrier is assigned a contiguous block of storage locations in buffer 66. Generally, however, the storage space that is allocated to a given component carrier is not necessarily contiguous. For example, some of the allocation schemes described below assign storage locations on a First-Needs-First-Gets (FNFG) basis, i.e., in accordance with the time of arrival of the soft metrics and regardless of the component carrier to which they belong. In the present example, buffer 66 is partitioned into three partitions (portions) 72, corresponding to three of component carriers 36 in signal 32. One of the component carriers in this example is not assigned memory space in the shared buffer.

Processing circuitry 60 comprises a buffer allocation module 68, which allocates memory space in buffer 66 for the various component carriers. Several example partitioning schemes are described further below. Buffer 66 is shared among the component carriers in the sense that at least some of the storage locations of the shared buffer are selectably assignable (by module 68) for storing soft metrics of any of the component carriers. In other words, a given storage location (e.g., address or address range) is not associated permanently with any single component carrier. A given storage location in buffer 66 may hold a soft metric belonging to a certain component carrier at a certain point in time, and a soft metric belonging to another component carrier at a different time.

This sort of shared buffering among the soft metrics of the various component carriers enables considerable reduction in memory size, in comparison with a scheme that allocates a dedicated respective buffer for each component carrier.

The volume of soft metrics computed for a given component carrier often varies over time. The volume of soft metrics may vary, for example, depending on the data rate that is currently used on the component carrier. The volume of soft metrics may also vary depending on channel conditions. When channel conditions are poor, the rate of retransmission is typically higher, and therefore the volume of soft metrics will increase, and vice versa. As yet another example, the volume of soft metrics may vary depending on the required quality of service, which may dictate a certain block error rate. For example, Voice-over-IP (VoIP) and File Transfer Protocol (FTP) transmissions typically have different quality of service requirements, and therefore different volumes of soft metrics. Since each component carrier may operate independently in terms of data rate and HARQ, the volume of soft metrics that originate from each component carrier may vary statistically over time, and may be uncorrelated from one component carrier to another.

Typically, the capacity of shared buffer 66 is chosen to be considerably smaller than the capacity that would be required to buffer the maximum theoretical volume of soft metrics from all component carriers. Because of the above-described statistical behavior of the volume of soft metrics on different component carriers, the reduced size of the shared buffer is sufficient with high likelihood.

Overflow in buffer 66 may occur, for example, if a large number of component carriers would produce high volumes of soft metrics simultaneously. Consider, for example, a scenario in which an exceedingly high volume of soft metrics is calculated simultaneously for multiple component carriers. In some embodiments, if the resulting volume of soft metrics is about to cause buffer overflow, processing circuitry 60 discards some of the soft metrics of a given component carrier, possibly causing a block error. The probability of such events, however, is small, and the resulting overflow can usually be tolerated.

When using HARQ on a given component carrier, processing circuitry 60 typically stores the soft metrics of the initial transmission of a certain data block in shared buffer 66. Upon receiving a retransmission of this data block, the processing circuitry typically retrieves ("unpacks") the soft metrics of the initial transmission, combines the soft metrics of the initial transmission with corresponding soft metrics of the retransmission, and then stores ("repacks") the combined soft metrics back in the shared buffer.

System 20 may use various schemes for partitioning shared buffer 66 into partitions 72, i.e., for dividing the memory space of the shared buffer among the component carriers. In some embodiments, the partitioning is static. In other embodiments, the partitioning is reconfigured at regular time intervals or in response to predefined events. In other embodiments, the partitioning is adaptive.

In some embodiments, the allocation of memory space in buffer 66 to the various component carriers is decided by module 68 in UE 28. In an embodiment, UE 28 notifies BS 24 of the currently-used allocation using uplink signaling. In this embodiment, the BS potentially considers the allocation of buffer 66 as a factor in generating signal 32. In another embodiment, UE 28 does not notify BS 24 of the allocation, in which case the adaptive allocation of memory space is transparent to the BS.

In an example embodiment, processing circuitry 60 stores incoming soft metrics in shared buffer 66 on a First-Needs-First-Gets (FNFG) basis, i.e., according to the time of arrival of the metrics and regardless of the component carriers to which they belong. If the shared buffer fills, subsequent soft metrics are discarded. If the shared buffer has available space for storing only part of an incoming block of soft metrics, some of the metrics are buffered and others are discarded. Using this technique, the processing circuitry automatically manages the multiple component carriers with their multiple stop-and-wait HARQ processes with high efficiency, even with a modest-size shared buffer.

In a variant of the above embodiment, when the shared buffer fills, processing circuitry 60 evaluates at least some of the soft metrics that are already stored in the buffer, and decides whether to override some of them with the newly-arriving soft metrics or to discard the newly-arriving soft metrics. The processing circuitry may evaluate various overriding criteria for this purpose.

In an example embodiment, processing circuitry 60 identifies the set of buffered metrics having the lowest magnitudes, and overrides it with the newly-arriving set of metrics. If the newly-arriving set of metrics is lower in magnitude than the previously-buffered sets, the newly-arriving set of metrics is discarded. These techniques give priority to soft metrics having large magnitudes over soft metrics having small magnitudes, since the former typically correspond to higher-quality data. Alternatively, any other suitable overriding criterion can be used by circuitry 60 to decide which soft metrics to retain in buffer 66 and which to discard.

In alternative embodiments, the overriding criterion prioritizes the soft metrics depending on the component carriers to which they belong, i.e., gives precedence to certain component carriers over other component carriers. This sort of prioritization is typically applied on top of the FNFG mechanism. In other words, the soft metrics are buffered according to their time of arrival, while giving priority to some component carriers over others. In an example embodiment, processing circuitry 60 may apply an allocation scheme that differs from FNFG for one or more of the component carriers, while retaining the FNFG scheme for the other component carriers.

In an embodiment, processing circuitry 60 prioritizes the soft metrics so as to maintain, for each component carrier, the same ratio between actual average throughput of incoming soft metrics and maximum potential throughput. In another embodiment, processing circuitry 60 applies a "round-robin" mechanism that gives priority to a different component carrier every predefined time interval. In yet another embodiment, processing circuitry 60 prioritizes the component carriers such that the overall throughput, summed over all component carriers, is maximized.

It is noted that some of the above techniques require the BS to be aware of the allocation scheme. The amount of signaling used for notifying the BS of the applicable allocation scheme is typically small. In an example embodiment, the BS and UE hold a predefined list of possible allocation schemes, and the UE signals to the BS an index of the currently-used allocation scheme.

In the above-described embodiments, the allocation of memory space in shared buffer 66 to the various component carriers is decided by UE 28, with or without notification to the BS. In alternative embodiments, the allocation of memory space in shared buffer 66 to the various component carriers is decided by BS 24, either based on or regardless of feedback from UE 28.

In many cases feedback from the UE is not necessary, since the BS already has information that enables efficient partitioning of the UE shared buffer. Information that is available to the BS and can be useful for this purpose comprise, for example, positive or negative acknowledgements (ACK/NACK) for each HARQ process on each component carrier, throughput on each component carrier, and the size of shared buffer 66 of the UE. In some embodiments, BS processor 40 in BS 24 optimizes the partitioning of shared buffer 66 based on the above information. In an embodiment, the BS processor uses the above information to configure the UE policy for handling shared buffer overflow. In alternative embodiments, the UE sends feedback to the BS, and the BS uses the feedback for partitioning shared buffer 66 among the component carriers.

In an example embodiment, BS 24 notifies UE 28 of the requested memory portions in buffer 66 that are to be allocated to the various component carriers. The BS processor determines the requested memory portions using any of the above-described methods. In another embodiment, the BS processor selects one of the above described prioritization schemes (e.g., FNFG mechanism, FNFG variants described above, or carrier-dependent prioritization) and notifies the UE of the allocation scheme to be applied.

When using carrier-dependent prioritization, in an embodiment, the BS processor sets the Incremental Redundancy (IR) version of each HARQ process based on the priority of the component carrier to which the HARQ process belongs. In some embodiments, the BS and UE hold a predefined list of possible allocation schemes, and the BS signals to the UE an index of the allocation scheme to be used.

The BS and UE configurations shown in FIG. 1 are example configurations, which are depicted solely for the sake of clarity. In alternative embodiments, any other suitable BS and/or UE configuration can be used. BS and UE elements that are not mandatory for understanding of the disclosed techniques have been omitted from the figure for the sake of clarity. Although the embodiments described herein refer mainly to shared buffering in a UE receiver, the disclosed techniques can similarly be used for shared buffering in a BS receiver.

In some embodiments, some or all of the elements of BS 24 and UE 28, including BS processor 40, TRX 44, RX FE 56, processing circuitry 60 and UE memory 64, are implemented in hardware, such as using one or more Radio Frequency Integrated Circuits (RFICs), Field-Programmable Gate Arrays (FPGAs) or Application-Specific Integrated Circuits (ASICs). In an alternative embodiment, certain BS and/or UE elements, such as BS processor 40 and/or parts of processing circuitry 60, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
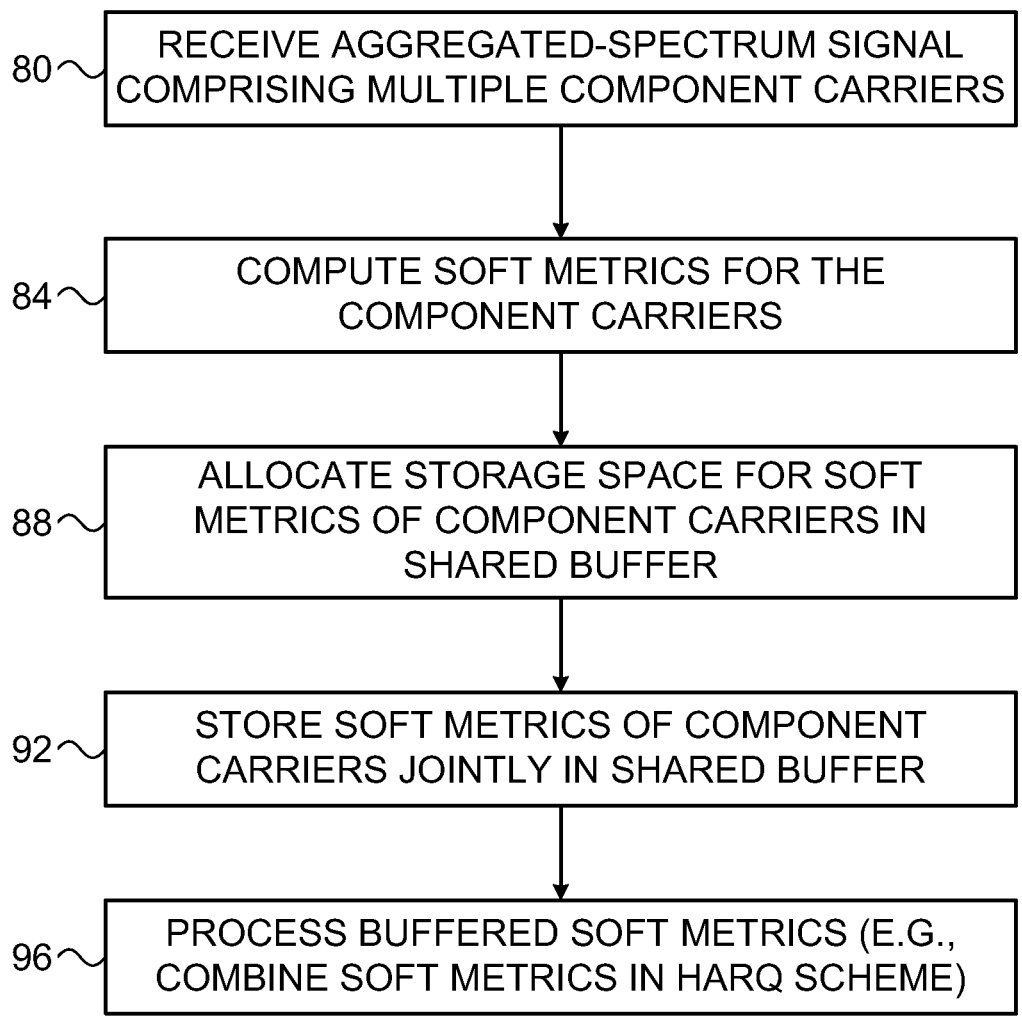
FIG. 2 is a flow chart that schematically illustrates a method for buffering in an aggregated-spectrum receiver, in accordance with an embodiment that is described herein.

FIG. 2 is a flow chart that schematically illustrates a method for buffering in an aggregated-spectrum receiver, in accordance with an embodiment that is described herein. The method begins at a reception operation 80, with RX FE 56 of UE 28 receiving an aggregated-spectrum signal. Processing circuitry 60 in UE 28 computes soft metrics for the data bits received over the various component carriers, at a metric calculation operation 84.

Buffer allocation module 68 in the UE allocates storage space in shared buffer 66 for the soft metrics belonging to each component carrier, at an allocation operation 88. As explained above, in some embodiments module 68 applies an allocation scheme that was decided in the UE, whereas in other embodiments the allocation scheme was decided in the BS and signaled to the UE.

At a buffering operation 92, processing circuitry 60 stores the soft metrics of the various component carriers jointly in shared buffer 66, in accordance with the allocation set at operation 88 above. Processing circuitry 60 processes the soft metrics that are buffered in shared buffer 66, at a processing operation 96. In an example embodiment, processing circuitry 60 carries out HARQ processes on the various component carriers, as described above.

Although the embodiments described herein refer mainly to buffering of soft metrics, the disclosed techniques can be used for shared buffering of any other suitable information that is related to processing of the component carriers.

Although the embodiments described herein refer mainly to aggregated-spectrum downlink signals, the disclosed techniques can also be used in aggregated-spectrum uplink signals, e.g., for implementing a shared buffer in a base station, or in any other suitable receiver. In such case, the sharing is of data from different UEs.

Although the embodiments described herein mainly address aggregated-spectrum signals comprising multiple LTE or LTE-A component carriers, the disclosed techniques can also be used for shared buffering in other communication systems in which a transmitter transmits multiple component carriers to a receiver. In the present context, the term "component carrier" is used to describe a component of the system's air interface having an independent retransmission (e.g., ARQ or HARQ) mechanism, which is operated independently of retransmission mechanisms on other component carriers. The disclosed techniques can be used, for example, for shared buffering in reception of multiple WCDMA channels that employ independent HARQ, or reception of multiple spatial layers of a Multiple-Input Multiple-Output (MIMO) signal.

It is noted that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
in a receiver, receiving from a transmitter an aggregated-spectrum signal comprising at least first and second component carriers in respective spectral bands;
buffering information related to processing one or more of the component carriers in at least one shared buffer, such that storage locations in the shared buffer are selectably assignable for storing at least first information related to the processing of the first component carrier and second information related to the processing of the second component carrier; and
processing the one or more of the component carriers in the receiver using the information buffered in the shared buffer.

2. The method according to claim 1, wherein buffering the information comprises setting a capacity of the shared buffer to be smaller than a sum of respective maximal data sizes of the at least first and second information.

3. The method according to claim 1, wherein receiving the aggregated-spectrum signal comprises receiving three or more component carriers, wherein buffering the information comprises selectably assigning the storage locations in the shared buffer to the information related to the processing of any of the three or more component carriers.

4. The method according to claim 1, comprising computing respective at least first and second soft metrics for the at least first and second component carriers, wherein buffering the information comprises jointly buffering the at least first and second soft metrics in the shared buffer.

5. The method according to claim 4, wherein receiving the aggregated-spectrum signal comprises receiving an initial transmission on the first component carrier and subsequently receiving on the first component carrier a retransmission related to the initial transmission, wherein computing the soft metrics comprises calculating the soft metrics both for the initial transmission and for the retransmission, wherein jointly buffering the soft metrics comprises buffering the soft metrics calculated for the initial transmission, and wherein processing the component carriers comprises demodulating the first component carrier by combining the soft metrics calculated for the initial transmission with the soft metrics computed for the retransmission.

6. The method according to claim 5, wherein jointly buffering the soft metrics comprises unpacking the soft metrics calculated for the initial transmission, combining the unpacked soft metrics with the soft metrics computed for the retransmission, and repacking the combined soft metrics in the shared buffer.

7. The method according to claim 1, wherein buffering the information comprises partitioning the shared buffer into at least first and second portions for buffering the at least first and second information, respectively.

8. The method according to claim 7, wherein partitioning the shared buffer comprises deciding on the at least first and second portions by the receiver.

9. The method according to claim 8, comprising signaling the decided partitioning from the receiver to the transmitter.

10. The method according to claim 1, comprising receiving from the transmitter one or more signaling messages that specify at least first and second portions into which the shared buffer is to be partitioned, and configuring the shared buffer responsively to the signaling messages.

11. The method according to claim 10, comprising sending feedback from the receiver to the transmitter, so as to enable the transmitter to specify the portions based on the feedback.

12. The method according to claim 1, wherein buffering the information comprises allocating storage space for buffering the information in the shared buffer based on a time of arrival of the information.

13. The method according to claim 1, wherein buffering the information comprises overriding at least part of the buffered information with subsequent information based on a predefined criterion.

14. Apparatus, comprising:
a receiver, which is configured to receive from a transmitter an aggregated-spectrum signal comprising at least first and second component carriers in respective spectral bands;
a memory, which holds at least one shared buffer; and
processing circuitry, which is configured to buffer in the shared buffer information related to processing one or more of the component carriers, such that storage locations in the shared buffer are selectably assignable for storing at least first information related to the processing of the first component carrier and second information related to the processing of the second component carrier, and to process the one or more of the component carriers in the receiver using the information buffered in the shared buffer.

15. The apparatus according to claim 14, wherein a capacity of the shared buffer is smaller than a sum of respective maximal data sizes of the at least first and second information.

16. The apparatus according to claim 14, wherein the processing circuitry is configured to exchange with the transmitter signaling indicative of assignment of the storage locations in the shared buffer to the at least first and second information.

17. A mobile communication terminal comprising the apparatus of claim 14.

18. A base station comprising the apparatus of claim 14.

19. A chipset for processing signals in a mobile communication terminal, comprising the apparatus of claim 14.

20. Apparatus, comprising:
a receiver, which is configured to receive from a transmitter an aggregated-spectrum signal comprising a plurality of component carriers in respective spectral bands;
a memory, which includes at least one shared buffer; and
a processing unit, which is configured to process signals transmitted on the plurality of component carriers by the transmitter, and to selectively allocate memory space in the shared buffer to ones of the respective component carriers, for use in processing data in the signals carried on the component carriers, in response to control signals transmitted by the transmitter.

* * * * *